(12) United States Patent
Abraham et al.

(10) Patent No.: US 8,311,268 B2
(45) Date of Patent: Nov. 13, 2012

(54) IMAGE OBJECT SEPARATION

(75) Inventors: Douglas Q. Abraham, Topsfield, MA (US); Yesna Oyku Yildiz, Boston, MA (US)

(73) Assignee: Analogic Corporation, Peabody, MA (US)

( * ) Notice: Subject to any disclaimer, the term of this patent is extended or adjusted under 35 U.S.C. 154(b) by 1113 days.

(21) Appl. No.: 12/199,333

(22) Filed: Aug. 27, 2008

(65) Prior Publication Data

US 2009/0232348 A1    Sep. 17, 2009

Related U.S. Application Data

(60) Provisional application No. 61/069,720, filed on Mar. 17, 2008.

(51) Int. Cl.
  *G06K 9/00*   (2006.01)
(52) U.S. Cl. ........ 382/100; 382/103; 382/131; 382/164; 382/173; 382/190
(58) Field of Classification Search .................. 382/100, 382/103, 131, 164, 173, 171, 190, 195, 199, 382/203, 206
See application file for complete search history.

(56) References Cited

U.S. PATENT DOCUMENTS

| | | | | |
|---|---|---|---|---|
| 7,596,275 | B1 * | 9/2009 | Richardson et al. | 382/224 |
| 2004/0109608 | A1 * | 6/2004 | Love et al. | 382/224 |
| 2005/0249416 | A1 * | 11/2005 | Leue et al. | 382/195 |

* cited by examiner

*Primary Examiner* — Ali Bayat

(74) *Attorney, Agent, or Firm* — Cooper Legal Group LLC

(57) ABSTRACT

Techniques and systems for segmenting one or more objects in a subject image resulting from subjecting one or more objects to imaging using an imaging apparatus are disclosed, such that limitations of image noise, object proximity, image intensity variations, shape complexity, and/or computational resources may be mitigated. Merely border edges of objects in a subject image can be generated, for example, by using edge detection and discarding interior edges. Geometric difference values of the identified boundaries of the objects in the subject image can be calculated. One or more transitions between objects can be identified by using the geometric difference values, for example, which may result in data that represents a location in the image of an object to be segmented.

21 Claims, 9 Drawing Sheets

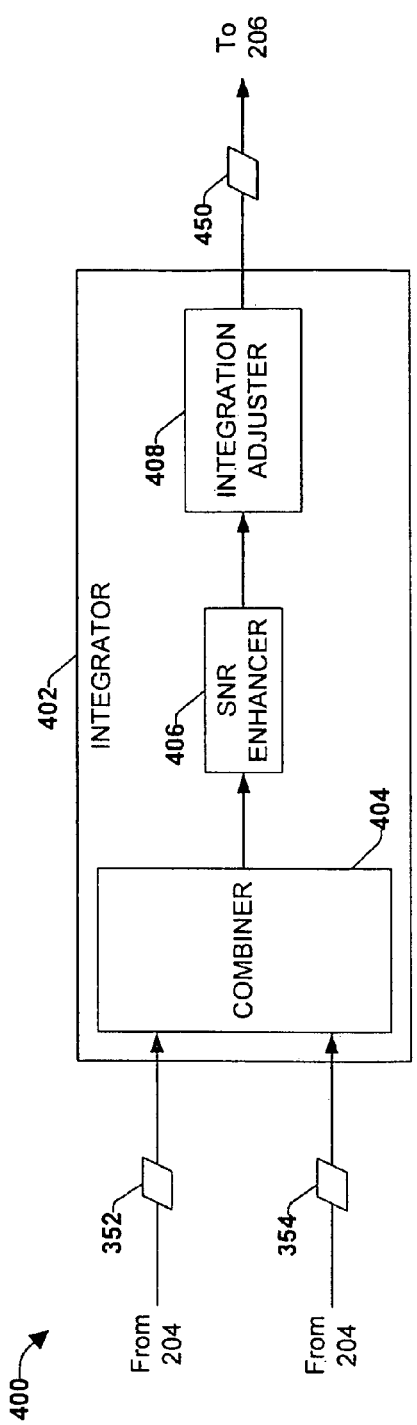
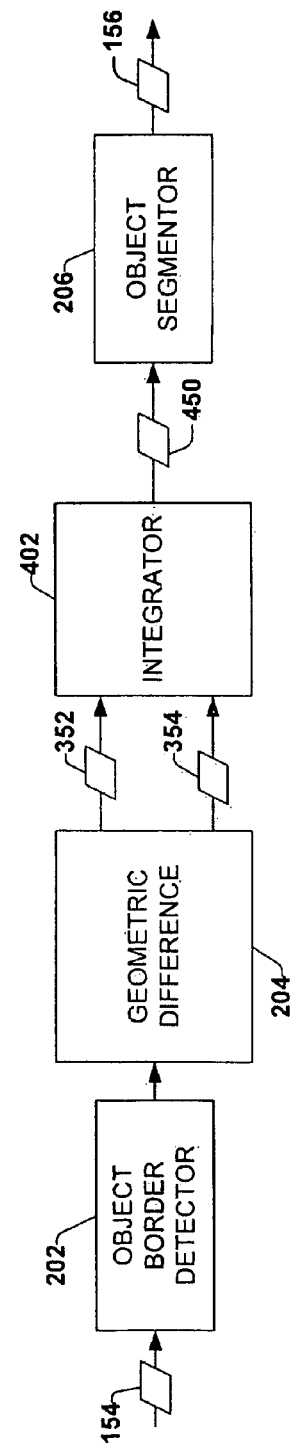
Fig. 4
Fig. 5

IMAGE OBJECT SEPARATION

RELATED APPLICATIONS

This application claims priority to and the benefit of U.S. Provisional Patent Application Ser. No. 61/069,720 which was filed, filed Mar. 17, 2008, entitled A Projection Based Method for Segmenting Bags, the entirety of which is hereby incorporated by reference as if fully set forth herein.

BACKGROUND

Security at airports and in other travel related areas is an important issue given today's sociopolitical climate, as well as other considerations. One technique used to promote travel safety is through baggage inspection. Often, an imaging apparatus is utilized to facilitate baggage screening. For example, an x-ray machine may be used to provide security personnel with a substantially two dimensional view of the contents of a bag and/or a computed axial tomography (CAT) device may be used to provide two and/or three dimensional views of objects. After viewing images provided by the imaging apparatus, security personnel may make a decision as to whether the baggage is safe to pass through the security check-point or if further (hands-on) inspection is warranted.

However, current screening techniques and systems utilize "bag-based" imaging apparatus, which merely screen one item at a time or need manual intervention by the screener to separate bags. That is, merely one bag can be run through an imaging apparatus before another bag can be put through the device. It can be appreciated that this "bag-based" imaging limits the number of items that can be imaged in a given period of time, thereby reducing the throughput at a security check-point.

Segmentation can be applied to baggage inspection in an attempt to increase the throughput at a security check-point. Segmentation essentially partitions a digital image into a plurality of regions (e.g., sets of pixels). However, segmentation techniques are typically limited to a particular application and/or a source that produces the image. Such techniques include, for example, "edge point grouping," "region segmentation," "merging," and the "Hough transform" (see "Generalizing the Hough transform to detect arbitrary shapes," Ballard D., 1987). Moreover, these techniques often create artificial shapes, and/or don't yield satisfactory results when objects in an image are close to one another (e.g., where multiple pieces of luggage are run through an imaging apparatus one right after another, with little to no space in-between). Further, region segmentation and/or merging techniques can be susceptible to image intensity variations, or changing object viewpoints. Additionally, the "Hough transform" can also be susceptible to image noise, can be limited to simple shapes, and can be computationally expensive.

SUMMARY

Aspects of the present application address the above matters, and others. According to one aspect, a system for segmenting one or more objects in a subject image resulting from subjecting one or more objects to imaging using an imaging apparatus includes an object border detector configured to identify merely border outlines of one or more respective objects in a subject image, a geometric difference component configured to generate geometric differences of the identified object borders from a subject image, and an object segmentor configured to identify one or more transitions between two or more objects in the subject image using the geometric differences.

According to one aspect, a method for segmenting one or more objects in an subject image resulting from subjecting one or more objects to imaging using an imaging apparatus includes generating image object borders comprising performing edge detection on the subject image and identifying object border locations in an image corresponding to merely outline edges of respective one or more objects, generating geometric differences of the object borders for the subject image, and identifying one or more transitions between two or more objects in an image using the geometric difference values.

According to one aspect, a method for segmenting one or more objects in an subject image resulting from subjecting one or more objects to imaging using an imaging apparatus includes generating image object borders comprising performing edge detection on the subject image and identifying object border locations in an image corresponding to merely outline edges of respective one or more objects, generating a geometric difference of the object borders for respective longitudinal slices of the subject image, filtering the geometric differences using a threshold value, adjusting the filtered geometric differences comprising resetting consecutive filtered geometric difference values determined to be approximately constant, generating combined geometric difference values comprising combining an adjusted filtered geometric difference value with a pre-filtered geometric difference value for respective slices of the corresponding subject image, generating integrated combined geometric difference values comprising generating increased signal to noise ratios for the combined geometric difference values for respective slices of the corresponding subject image, adjusting the integrated combined geometric difference values comprising resetting consecutive difference of differences values determined to be approximately constant, and identifying one or more transitions between two or more objects in an image using the adjusted integrated combined geometric difference values.

According to one aspect, a computer usable medium comprising computer readable programming configured to segment one or more objects in an subject image resulting from subjecting one or more objects to imaging using an imaging apparatus, which when executed on a computing device, causes the computing device to generate image object borders comprising performing edge detection on the subject image and identifying object border locations in an image corresponding to merely outline edges of respective one or more objects, generate a geometric difference of the object borders for respective longitudinal slices of the subject image, and identify one or more transitions between two or more objects in an image using the geometric difference values.

Those of ordinary skill in the art will appreciate still other aspects of the present invention upon reading and understanding the appended description.

DESCRIPTION OF THE DRAWINGS

FIG. 4 is another component block diagram illustrating details of one or more components of an environment wherein segmentation of objects in an image may be implemented as provided herein.

FIG. 5 is a schematic block diagram illustrating one embodiment of one or more components of an environment wherein segmentation of objects in an image may be implemented as provided herein.

DETAILED DESCRIPTION

Figure 1:
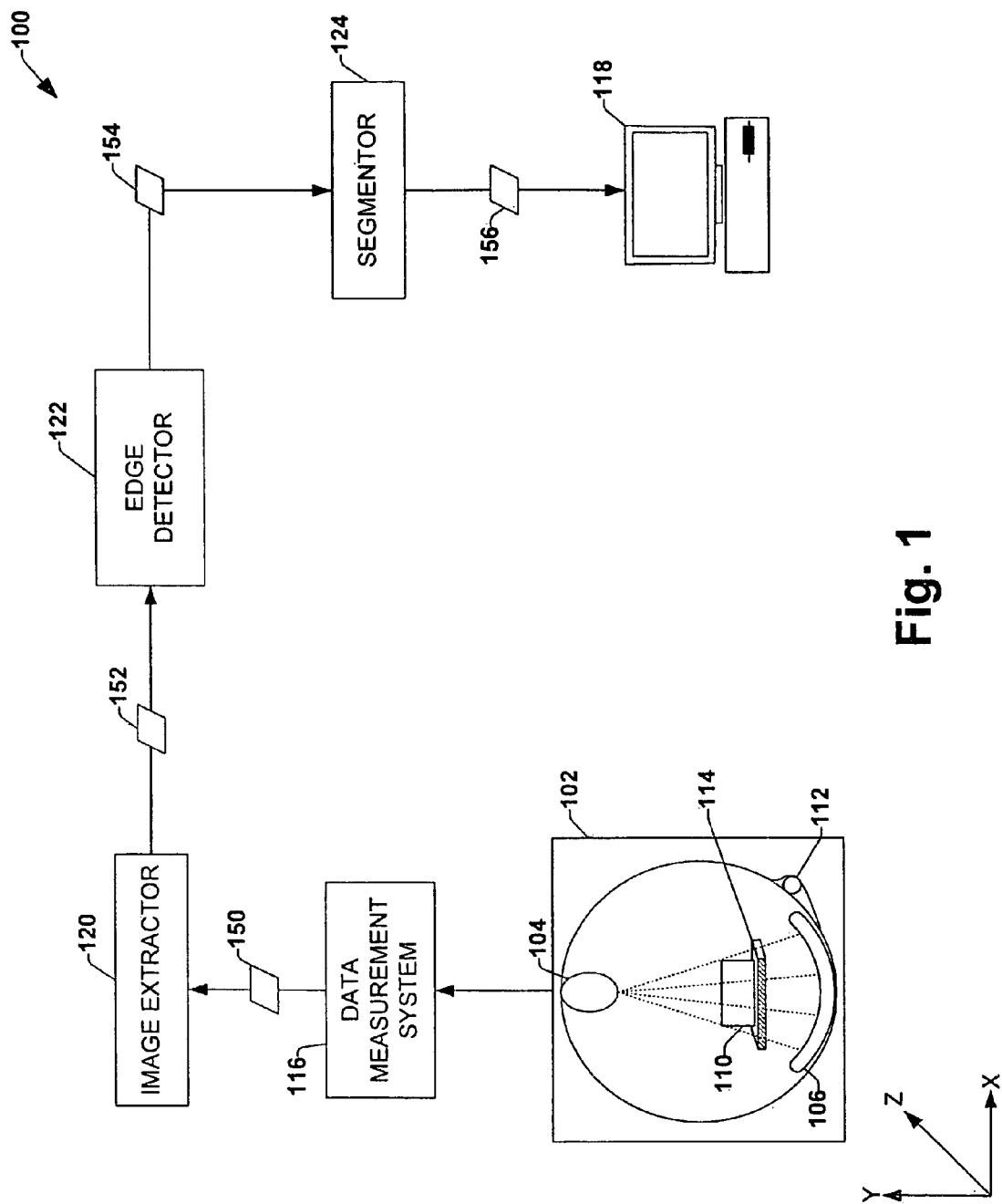
FIG. 1 is a schematic block diagram illustrating an environment wherein segmentation of objects in an image may be implemented, as provided herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 is an illustration of an example environment 100 in which a system may be employed for segmenting objects in an image resulting from imaging of the objects using an imaging apparatus (e.g., a CAT scanner). In the example environment 100 the imaging apparatus comprises an object scanning apparatus 102, such as a security scanning apparatus (e.g., used to scan luggage at an airport). The scanning apparatus 102 may be used to scan one or more objects 110 (e.g., a series of suitcases at the airport). The scanning apparatus typically comprises a radiation source 104 (e.g., an X-ray tube), an array of radiation detectors 106 (e.g., X-ray detectors), a rotator 112 (e.g., a gantry motor) for rotating the radiation source 104 and detectors 106 around the object(s) being scanned 110, and a conveyor 114 (on or about the axis of rotation) configured to convey the object(s) 110 from an upstream portion of the object scanning apparatus 102 to a downstream portion. It will be appreciated that, while the exemplary environment utilizes an x-ray scanning apparatus, the systems and techniques, described herein, are not limited to x-rays or scanning devices. For example, the system may utilize an infrared imaging device to generate images based on infrared imaging of one or more objects.

As an example, a-computer tomography (CT) security scanner 102 that includes an X-ray source 104, such as an X-ray tube, can generate a fan, cone, wedge, or other shaped beam of X-ray radiation that traverses one or more objects 110, such as suitcases, in an examination region. In this example, the X-rays are emitted by the source 104, traverse the examination region that contains the object(s) 110 to be scanned, and are detected by an X-ray detector 106 across from the X-ray source 104. Further, a rotator 112, such as a gantry motor drive attached to the scanner, can be used to rotate the X-ray source 104 and detector 106 around the object(s) 110, for example. In this way, X-ray projections from a variety of perspectives of the suitcase can be collected, for example, creating a set of X-ray projections for the object (s). While illustrated as a third generation system, those of ordinary skill in the art will understand that fourth generation and other implementations are also contemplated. As yet another example, the radiation source 104 and detector 106 may remain stationary while the object is rotated.

In the example environment 100, a data measurement system 114 is operably coupled to the scanning apparatus 102, and is typically configured to collect information and data from the detector 106, and may be used to compile the collected data into projection space data 150 for an object 110. As an example, X-ray projections may be acquired at each of plurality of angular positions with respect to the object 110. Further, as the conveyor 114 convey the object(s) 110 from an upstream portion of the object scanning apparatus 102 to a downstream portion (e.g., conveying objects through the rotational axis of the scanning array), the plurality of angular position X-ray projections may be acquired at a plurality of points along an axis of the conveyor with respect to the object(s) 110. In one embodiment, the plurality of angular positions may comprise an X and Y axis with respect to the object(s) being scanned, while the conveyor axis may comprise a Z axis with respect to the object(s) being scanned.

In the example environment 100, an image extractor 120 is coupled to the data measurement system 114, and is configured to receive the data 150 from the data measurement system 114 and generate image data 152 indicative of the scanned object 110 using a suitable analytical, iterative, and/or other reconstruction technique (e.g., backprojecting from projection space to image space).

In one embodiment, the image data 152 for a suitcase, for example, may ultimately be displayed on a monitor 118 (e.g., desktop or laptop computer) for human observation. In this embodiment, an operator may isolate and manipulate the image, for example, rotating and viewing the suitcase from a variety of angles, zoom levels, and positions.

It will be appreciated that, while the example environment 100 utilizes the image extractor 120 to extract image data from the data 150 generated by the data measurement system 114, for example, for a suitcase being scanned, the techniques and systems, described herein, are not limited to this embodiment. In another embodiment, for example, image data may be generated by an imaging apparatus that is not coupled to the system. In this example, the image data may be stored onto an electronic storage device (e.g., a CD ROM, hard-drive, flash memory) and delivered to the system electronically.

In the example environment 100, an edge detection system 122 may receive the image data 152, for example, for the scanned object(s) 110, to perform edge detection on the image of the object(s). In this example, the edge detection system 122 may be configured to detect edges in an image of the scanned object(s) 110, to generate an image comprising edge data for the object(s) 110. Further, in this example, because image data for the object(s) can be acquired at each of plurality of angular positions with respect to the object(s) 110, the edge data 154 produced by the edge detection system 122 can comprise object edges from a plurality of angular positions with respect to the object(s) 110. In this way, for example, the edge data 154 may comprise object edges of a series of objects from a plurality of angular positions (e.g., including the X, Y, and Z axes). It will be appreciated that the exemplary system, described herein, is not limited to any particular edge detection system or method.

In the example environment 100, the edge data 154 can be sent to an object segmentor 124, which can be configured to segment objects, for example, in an image resulting from subjecting the object(s) 110 to scanning using a scanning apparatus (e.g., a CT scanner). As an example, when a plurality of suitcases are run through a security scanning apparatus 102 at an airport security station they can be placed on the scanner's conveyor 114 in series (e.g., in a single layer line of suitcases along the conveyor) as they enter the scanning apparatus 102. In this example, the suitcases may lie in such a proximity to each other (e.g., touching each other) that an automated threat detection system associated with the security scanner may not be able to discern a single suitcase from the series of suitcases. The segmentor 124 can be configured to distinguish respective objects from a series of objects in an image of the scanned series of objects, for example.

In the exemplary environment 100, in one embodiment, segmentation data 156 comprising data that distinguishes individual objects from a series of scanned objects, can be sent to a display 118. In this embodiment, a human operator may view a distinguished object to determine whether the object contains a potential threat, for example. In another embodiment, the segmentation data may be sent to an automated threat detection system that can, for example, automatically determine whether respective distinguished objects contain potential threats.

Figure 2:
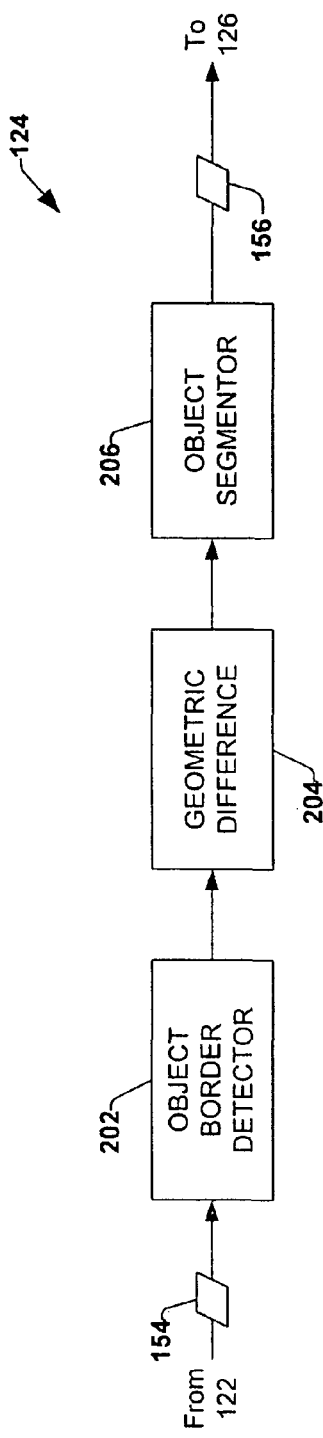
FIG. 2 is a component block diagram illustrating one or more components of an environment wherein segmentation of objects in an image may be implemented as provided herein.

FIG. 2 is a component block diagram illustrating an example system 124 for segmenting one or more objects in a subject image resulting from subjecting one or more objects to imaging using an imaging apparatus. In this embodiment, edge data 154 is sent from an edge detection system 122 and received by an object border detector 202. The object border detector 202 can be configured to identify merely border outlines of one or more respective objects in a subject image, for example, the edge data image 154. As an example, if objects in the edge data 154 correspond to suitcases that have been scanned by a CT scanner, edge data representing contents of the suitcases can be discarded and merely the edge data of the suitcases' borders (e.g., contours of the outside of the suitcase) can be generated by the object border detector 202.

In FIG. 2, the example segmentor 124 further comprises a geometric difference component 204, which can be configured to generate geometric differences of the identified object borders from a subject image. As an example, at an airport security checkpoint scanning system scanned objects typically comprise traveler's bags and/or bins containing other objects that are subject to separate scanning. In this example, these bags and bins are commonly of a uniform shape (e.g., rectangular), therefore, determining a geometric difference can generate a relatively constant one-dimensional line, while transitions between bags/bins can result in a change to that line.

In one embodiment, the geometric difference component 204 can calculate a geometric difference by dividing a two-dimensional image of the object border edge data longitudinally (e.g., creating a dividing line in the image, creating two equal halves along a Z axis). In this embodiment, an absolute value of a border edge (e.g., a distance from the dividing line to the border edge) of the top section of the image can be combined with (e.g., subtracted from) the absolute value of a border edge of the bottom section of the image. In this way, in this embodiment, for respective vertical slices of the image (e.g., slices along an X axis) the geometric difference component 204 can subtract indices of edges in a vertical direction in the image to generate a geometric difference for respective vertical slices of the image.

In FIG. 2, the example segmentor 124 further comprises an object segmentor 206, which can be configured to identify one or more transitions between two or more objects in the subject image using the geometric differences. As an example, the geometric differences of respective vertical slices of an image generated by the geometric difference component 204 can be sent to the object segmentor 206. In this example, the object segmentor 206 can use the geometric differences to detect transitions between objects (e.g., bags) in an image, and data comprising locations of the transitions 156 can be generated.

In one embodiment, for example, geometric differences for respective vertical slices (e.g., slices along the X axis of the image) can be plotted as a one-dimensional line representing one or more objects moving along the axis of an imaging system's conveyor (e.g., as in FIG. 1, 114, the Z axis). In this embodiment, the object segmentor 206 can detect a change in the geometric differences as represented by the one-dimensional line. For example, a falling edge along the one-dimensional line may represent a transition from an object, while a rising edge may indicate a transition into another object. In this way, the object segmentor 206 can determine a location of transitions between objects in the image, generating segmentation data 156 for respective objects, for example.

Figure 3:
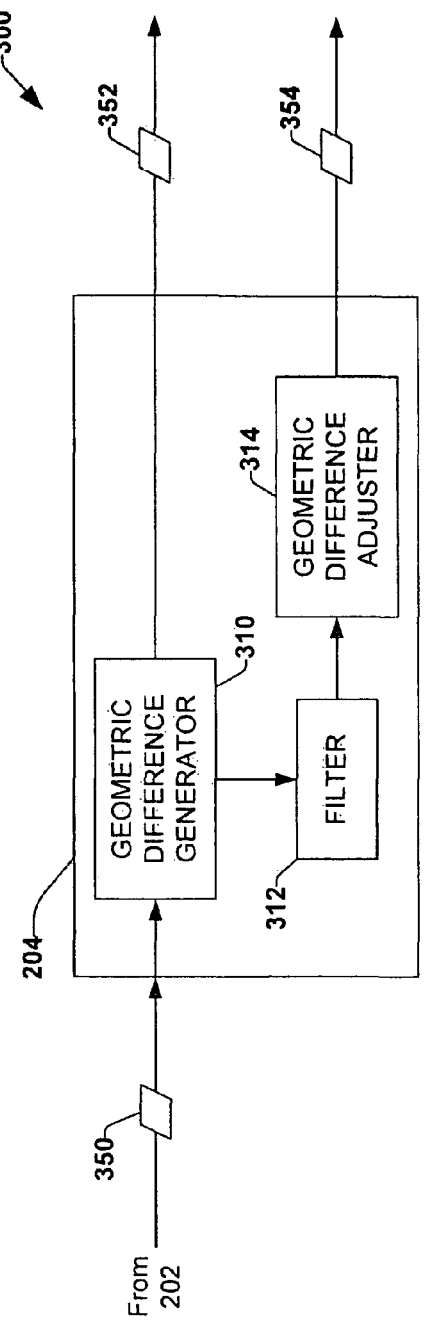
FIG. 3 is a component block diagram illustrating details of one or more components of an environment wherein segmentation of objects in an image may be implemented as provided herein.

FIG. 3 is a component block diagram illustrating one embodiment 300 of an example geometric difference component 204. In this embodiment 300, the geometric difference component 204 comprises a geometric difference generator 310. The geometric difference generator 310 can be configured to receive object border data 350, from the object border detector 202, and generate geometric differences 352 of the identified object borders from a subject image, as described above in FIG. 2.

In this embodiment, 300, the geometric difference component 204 further comprises a geometric difference filter 312, which can be configured to filter the geometric differences using a threshold value. As an example, the geometric difference filter 312 can be used to produce a smoother one-dimensional representation of the geometric differences, such that changes in the geometric differences, over a small distance along a X axis of the image, are suppressed. In this example, the small changes are likely to be contained within the same object (e.g., a suitcase may comprise handles, wheels, and other extrusions that are not transitions), and not related to object transitions. In one embodiment of the filter 312, the threshold value can define a distance in the X axis of the subject image over which small changes in the geometric differences will be suppressed. In this way, in this embodiment, the filter can reduce noise and increase resolution for the one-dimensional representation of the subject image.

In FIG. 3, the example geometric difference component 204 further comprises a geometric difference adjuster 314, which can be configured to generate adjusted filtered geometric difference values 354 for the subject image. In this embodiment, generating adjusted filtered geometric difference values 354 can comprise determining slope areas of the filtered geometric differences from the geometric difference filter 312. For example, a one-dimensional representation of the filtered geometric differences may yield areas having a particular slope corresponding to variations in an object in the subject image (e.g., a suitcase may comprise handles, wheels, and other extrusions that are not transitions), and/or transitions between objects in the subject image.

Further, in this embodiment, generating adjusted filtered geometric difference values 354 can comprise resetting consecutive filtered geometric difference values determined to be approximately constant. As an example, in one embodiment, a slope threshold value may be established, and the slope values of the filtered geometric differences can be compared to the slope threshold value. In this example, those filtered geometric differences that are within the slope threshold value may be determined to be approximately constant. Further, those areas having consecutive filtered geometric difference values determined to be approximately constant can be reset (e.g., set to zero). In this way, for example, a one-dimensional representation of adjusted filtered geometric difference values 354 may yield areas that are approximately constant as zero, while areas that are not approximately constant (e.g., object transitions) may be shown as a rising and/or falling line.

FIG. 4 is a component block diagram illustrating one embodiment 400 of an example integrator 402, which can be configured to generate adjusted integrated combined geometric differences for the subject image. As an example, in one embodiment, if transitions between objects in a subject image (e.g., transitions between luggage in a scanned image) can be emphasized in values used for detecting the transitions, a system's accuracy may be improved. Further, in this embodiment, enhancing a signal to noise ratio (e.g., emphasizing a rising and falling of object boundaries in a one-dimensional representation of a values for a subject image), while reducing localized noise variations may also improve a system's accuracy.

In FIG. 4, the example integrator 402 comprises a difference combiner 404, which can be configured to combine a geometric difference 352 with a corresponding adjusted filtered geometric difference 354 for the subject image. For example, in one embodiment, the adjusted filtered geometric differences 354 from the geometric difference component 204 can be subtracted from corresponding geometric differences 352 in the subject image to generate combined geometric differences. In this embodiment, for example, slope areas for the resulting combined geometric differences can be emphasized, which may allow for improved accuracy in object transitions for the subject image.

The example integrator 402 further comprises a signal to noise ratio (SNR) enhancer 406, which can be configured to increase SNRs for the combined geometric differences. Increasing SNRs, in this embodiment, can comprise integrating the combined geometric differences to yield integrated combined geometric differences for the subject image, having a desired (e.g., higher) SNR, while reducing localized noise variations (e.g., small variations in a one-dimensional representation of the integrated combined geometric differences). Therefore, in one embodiment, resulting values may produce a one dimensional representation of the subject image having smoother variations with emphasized rising and falling edges for object transitions.

In this embodiment 400, the example integrator 402 further comprises an integration adjuster 408, which can be configured to reset consecutive integrated combined geometric difference values determined to be approximately constant, yielding adjusted integrated combined geometric difference values 450. As an example, in one embodiment, a variation threshold value may be established, and variations in the integrated combined geometric differences can be compared against the variation threshold value. In this example, those integrated combined geometric differences that are within the variation threshold value may be determined to be approximately constant. Further, those areas having consecutive integrated combined geometric differences determined to be approximately constant can be reset (e.g., set to zero). In this way, for example, a one-dimensional representation of integrated combined geometric differences values may yield areas that are approximately constant as zero, while areas that are not approximately constant (e.g., object transitions) may be shown as a rising and/or falling line.

FIG. 5 is a schematic block diagram illustrating one embodiment of an example system 500 for segmenting objects in a subject image, resulting from subjecting objects to an imaging apparatus. In this embodiment, the example system 500 comprises an object border detector 202. As described above (FIG. 2), the object border detector 202 can be configured to identify merely border outlines of one or more respective objects in a subject image, for example, edge data image 154. The example system 500 further comprises a geometric difference component 204, which can be configured to generate geometric differences 352 of the identified object borders from a subject image. As described above (FIG. 3), the geometric difference component 204 can also generate adjusted filtered geometric differences 354.

The example system 500 further comprises an integrator 402, which can be configured to generate adjusted integrated combined geometric differences 450, for the subject image, as described above (FIG. 4). In this embodiment, the example system 500 further comprises an object segmentor 206, which can be configured to identify one or more transitions between two or more objects in the subject image using the geometric differences, as described above (FIG. 2). In this embodiment, the object segmentor 206 can use the adjusted integrated combined geometric differences 450 to identify one or more transitions between two or more objects in the subject image. Using the adjusted integrated combined geometric differences 450, for example, may improve accuracy of object transition identification in this example system 500.

A method may be devised for segmenting one or more objects in a subject image resulting from subjecting one or more objects to imaging using an imaging apparatus. In one embodiment, the method may be used security station at an airport used for scanning passenger luggage. In this embodiment, for example, passenger luggage may be sent through a CT scanner, which can produce a stream of real-time images of the scanned luggage, or may send real-time image data to an automated threat detection system. In this example, luggage can often be placed in such proximity on a conveyor, used to draw the luggage through the CT scanner, that individual objects may not be distinguishable in the resulting image data. Therefore, in this example, the object segmentation method may be used to segment respective luggage pieces so that an automated threat detection system may operate on single pieces of luggage.

Figure 6:
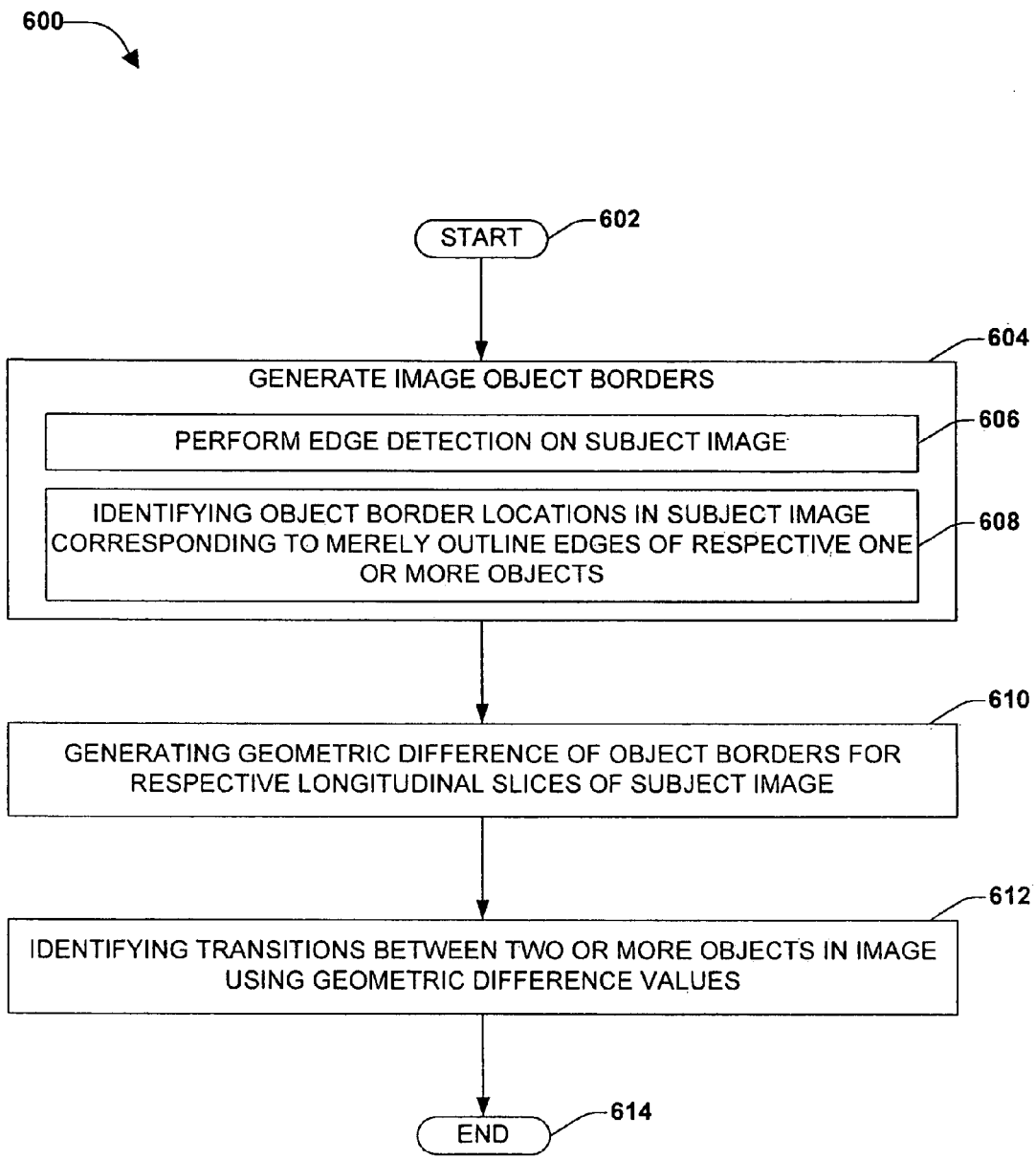
FIG. 6 is a flow chart diagram of an example method for segmenting objects in an image produced by imaging of one or more objects.

FIG. 6 is a flow chart diagram of an example method 600 for segmenting objects in an image produced by imaging of one or more objects. The example method 600 begins at 602 and involves generating image object borders, at 604, for one or more objects in a subject image. As an example, an image that is produced by subjecting one or more objects to an imaging apparatus (e.g., a CT scanner) may comprise items that are found inside a scanned object (e.g., personal belongings inside a passenger's suitcase). This portion of the example method 600 attempts to identify merely outline borders for the one or more objects in the subject image.

At 606, edge detection is performed on the subject image. For example, an edge detection algorithm may be used on the subject image, which can produce edge data for objects in the subject image. In this example, edge data can show borders of objects in the subject image. It will be appreciated that the method, described herein, is not limited to any particular edge detection method, system or algorithm. Those skilled in the art may devise edge detection techniques that can be used in the example method 400 to yield improved border edges.

At 608, object border locations are identified in the subject image, which correspond to merely outline edges of the respective one or more objects. As an example, while an image resulting from subjecting one or more objects to an imaging apparatus (e.g., an infrared scanner) may show objects that contain items, this embodiment attempts to identify merely the outline borders of the imaged objects. In this example, edge data from an interior portion of an object in the subject image can be discarded, resulting in data comprising merely the border edges of respective imaged objects.

Figure 8:
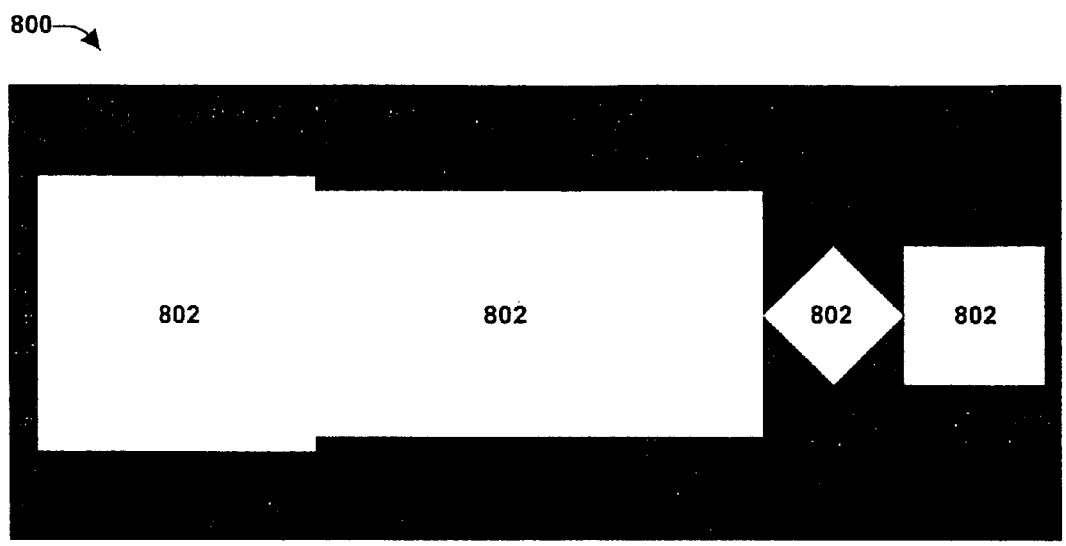
FIG. 8 is an illustration of an example image that may be used to segment objects in an image.
Figure 9:
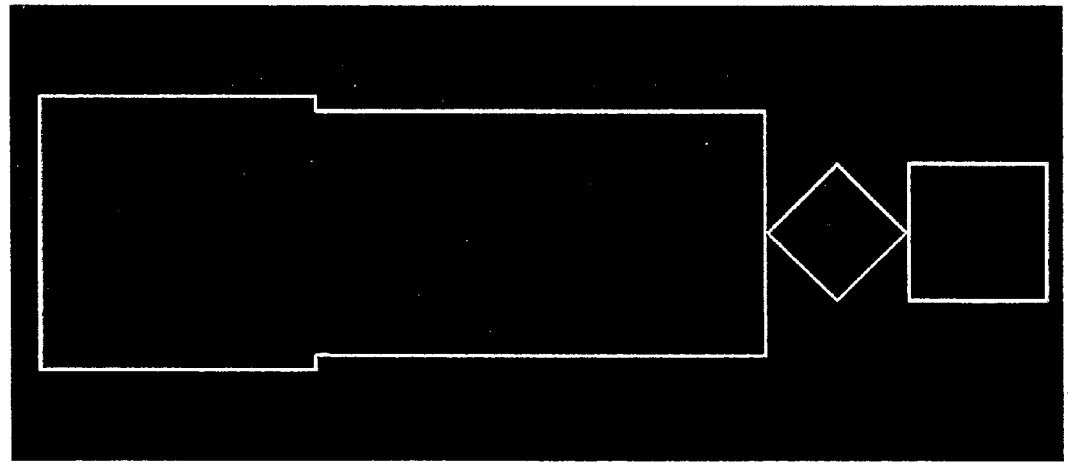
FIG. 9 is an illustration of an example image of object border edges that may be used to segment objects in an image.

FIG. 8 is an illustration of an example image 800 that may be used to segment objects in an image. In this example image 800, four objects 802 (e.g., square, rectangle, diamond, small square) have been subjected to imaging, for example, producing a two-dimensional image of the respective objects. FIG. 9 is an illustration of an example image 900 of object border edges that may be used to segment objects in an image. In this example image 900, the subject image (e.g., example image 800) has been subjected to edge detection, and interior edge data has been discarded, yielding an image comprising merely border outlines of the three objects that were imaged.

Turning back to FIG. 6, at 610 in the exemplary method 600, geometric differences of the object borders for the subject image are generated. In one embodiment, a geometric difference can be calculated by dividing a two-dimensional image of the object border edge data longitudinally. In this embodiment, an absolute value of a border edge of the top section of the image can be combined with (e.g., subtracted from) the absolute value of a border edge of the bottom section of the image. In this way, in this embodiment, for respective vertical slices of the image (e.g., columns in the subject image) one can subtract indices of edges in a vertical direction in the image to generate a geometric difference for respective vertical slices of the image.

Figure 10:
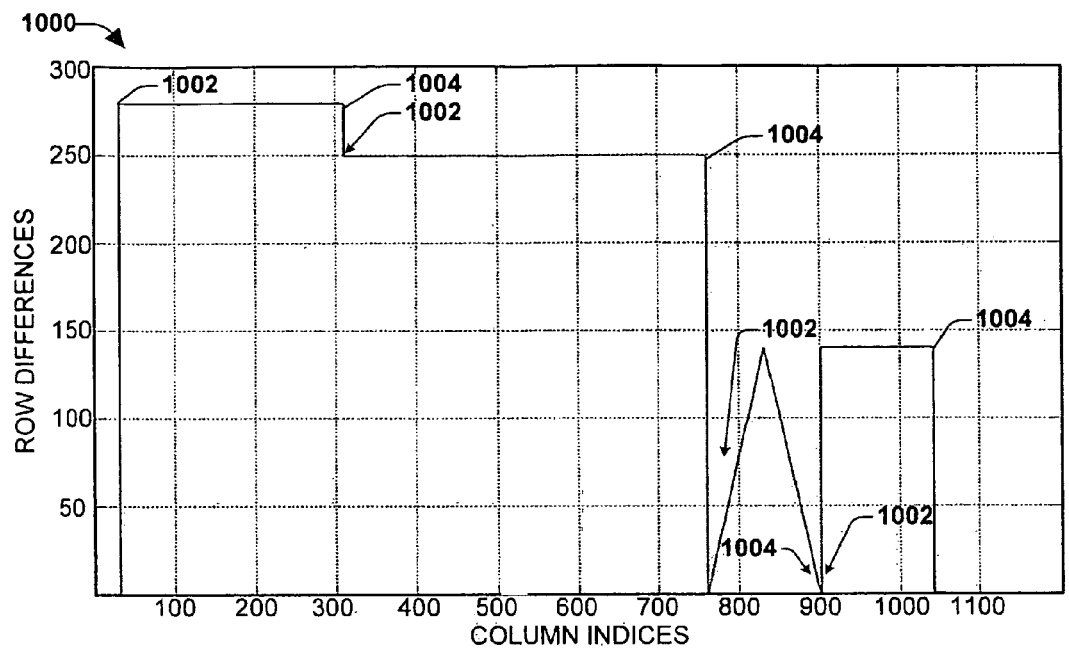
FIG. 10 is an example graph illustrating results from one or more portions of the method for segmenting objects in an image produced by imaging of one or more objects.

FIG. 10 is an example graph 1000 illustrating example generated geometric differences for an image produced by imaging of one or more objects. In the example graph 1000, the generated geometric difference values are shown along a "Y" axis as "row differences," while an "X" axis depicts a location in a subject image as "column indices" (e.g., vertical slices of the subject image). Calculated geometric difference values for the subject image can yield transitions into an object 1002, and transitions out of an object 1004. In this example, a location of transitions between objects may be identified in a subject image.

Turning again back to FIG. 6, at 612 of the example method 600, one or more transitions between two or more objects in an image are identified using the geometric difference values. As an example, in one embodiment, the geometric difference values can be run through an algorithm that detects object transitions in the geometric differences. Having identified one or more transitions between two or more objects in an image, the example method 600 ends at 614.

In one aspect, object segmentation accuracy may be improved by subjecting the geometric difference values to adjustment and/or filtering. As an example, passenger luggage can come in a variety of shapes and sizes, each potentially having its own variations comprising handles, wheels, pouches, etc. In this example, resulting geometric differences from images produced by subjecting the variety of luggage to imaging may be "noisy," and may produce "false" transitions due to the variations. As an example, in one embodiment, minor variations in geometric differences over a small area can be smoothed, to help mitigate object variations (e.g., bag indentations). Further, if transitions between objects in a subject image can be emphasized, a system's accuracy may be improved. Additionally, in this embodiment, enhancing a signal to noise ratio, while reducing localized noise variations may also improve a system's accuracy.

Figure 7:
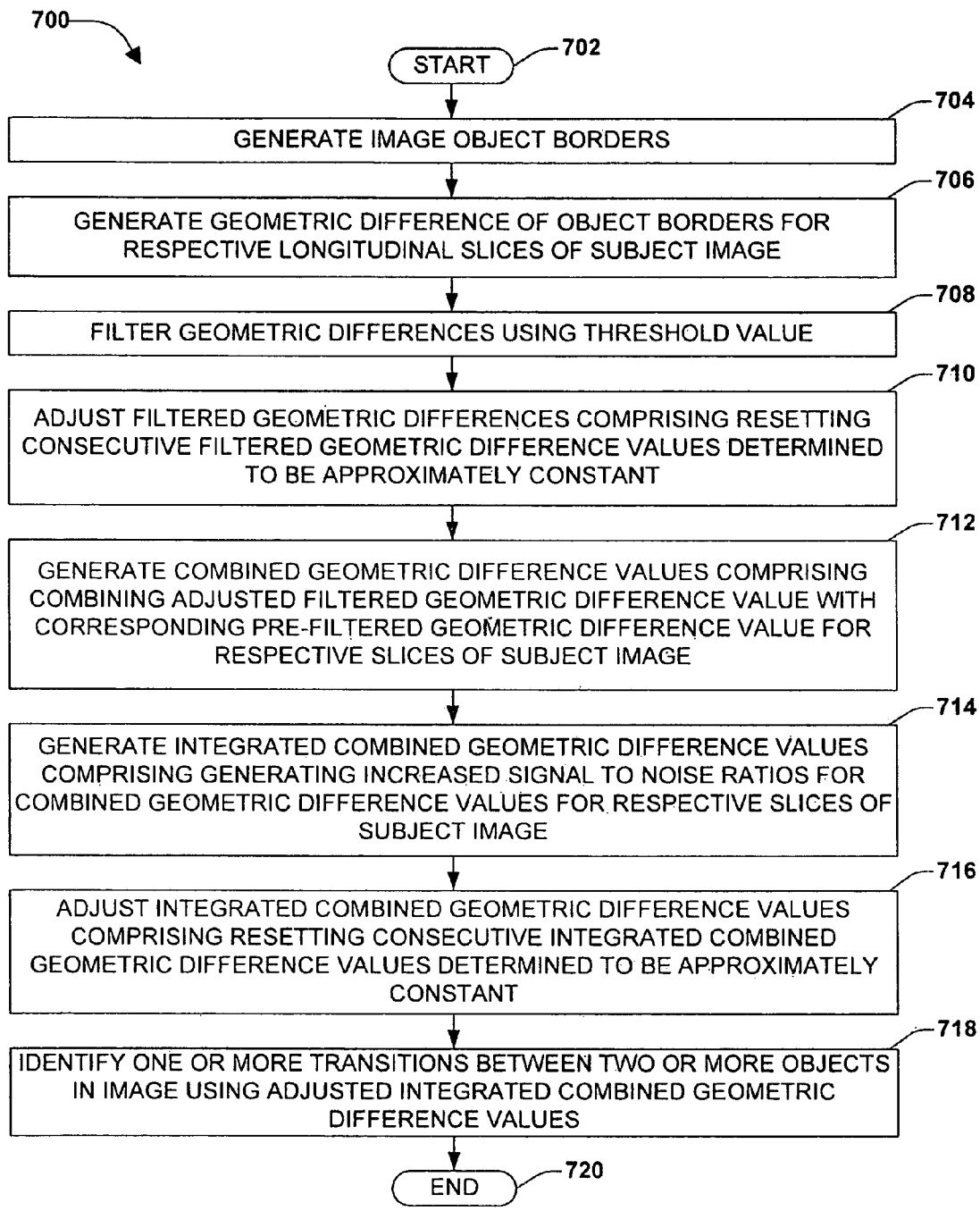
FIG. 7 is a flow chart diagram of one embodiment of an example method for segmenting objects in an image produced by imaging of one or more objects.

FIG. 7 is a flow chart diagram of one embodiment of an example method 700 for segmenting objects, in an image produced by imaging of one or more objects. The example method 700 begins at 702 and involves generating image object borders, at 704, for respective one or more objects in a subject image. As described above (FIG. 6, 604), generating image object borders can comprise subjecting the image to edge detection and identifying merely borders of the one or more objects in the subject image.

In this embodiment of the example method 700, at 706, geometric difference values of the object border are generated for respective longitudinal slices of the subject image. As an example, as objects are imaged by an imaging apparatus (e.g., run along a conveyor through a CT scanner) real-time data for longitudinal slices of the object can be subjected to the example segmentation method. In this example, a geometric difference value can be determined for respective longitudinal slices in real-time. In another embodiment, an image of scanned objects may be subjected to the example segmentation method, whereby the data from longitudinal slices of the subject image is analyzed separately (e.g., objects can be scanned and the resulting image is transmitted to a system that utilizes the example method for segmentation). In this embodiment of the example method 700, the geometric differences can be determined as described above in FIG. 6, at 610.

At 708, geometric differences are filtered using a threshold value (e.g., an adaptive threshold value). As an example, filtering the geometric differences can produce a smoother one-dimensional representation of the geometric differences, such that changes in the geometric differences, over a small distance in the subject image, are suppressed. In this example, the small changes are likely to be contained within the same object (e.g., a suitcase's handles, wheels, and other extrusions that are not transitions), and not related to object transitions. In one embodiment, the threshold value can define a distance in the subject image over which small changes in the geometric differences will be suppressed. In this way, in this embodiment, filtering can reduce noise and increase resolution for the one-dimensional representation of the subject image.

At 710, in FIG. 7, filtered geometric differences are adjusted, which comprises resetting (e.g., setting to zero) consecutive filtered geometric difference values that are determined to approximately constant. For example, a one-dimensional representation of the filtered geometric differences may yield areas having a particular slope corresponding to variations in an object in the subject image, and/or transitions between objects in the subject image (e.g., see FIG. 10). In one embodiment, mitigating areas that are approximately constant (e.g., having consecutive values that are within a threshold value), and emphasizing areas having a slope that is not approximately constant (e.g., having consecutive values that are not within a threshold value) may improve segmentation accuracy.

In one embodiment, an adaptive threshold value may be used to determine those areas that are approximately constant. In this embodiment, those areas that are determined to be approximately constant can be reset (e.g., set to zero). In this way, for example, a one-dimensional representation of adjusted filtered geometric difference values may yield areas that are approximately constant as zero, while areas that are not approximately constant (e.g., object transitions) may be shown as a rising and/or falling line.

At 712 of FIG. 7, combined geometric difference values are generated, which comprises combining the adjusted filtered geometric difference value with (e.g., subtracting from) the corresponding pre-filtered geometric difference value for respective slices of the subject image. For example, in one embodiment, the adjusted filtered geometric differences can be subtracted from corresponding geometric differences in the subject image to generate combined geometric differences. In this embodiment, for example, slope areas for the resulting combined geometric differences can be emphasized, which may allow for improved accuracy in object transitions for the subject image.

Figure 11:
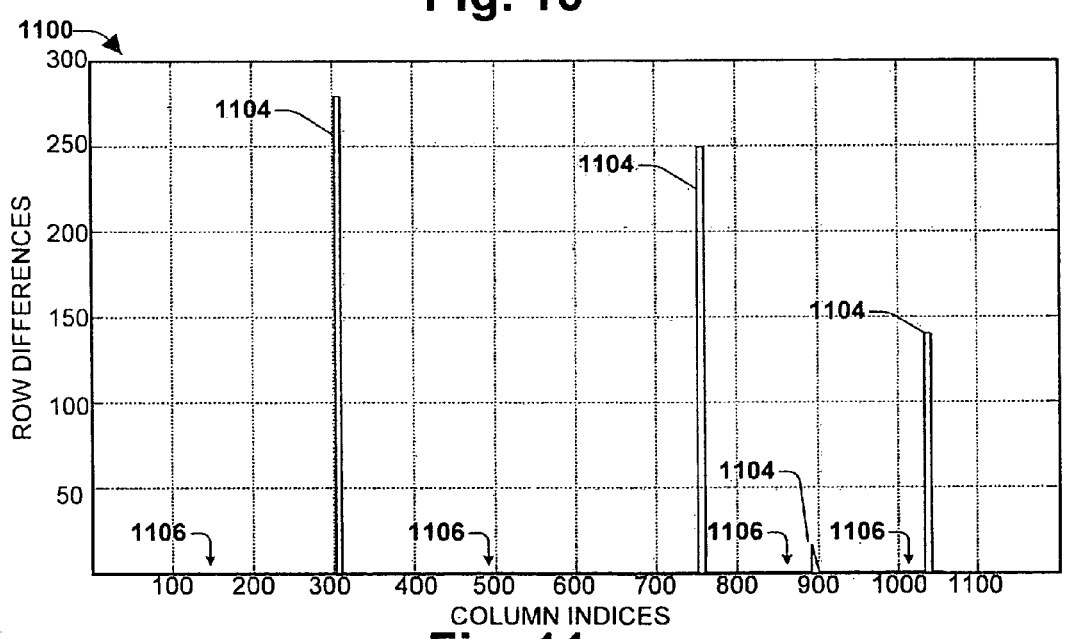
FIG. 11 is an example graph illustrating results from one or more portions of the method for segmenting objects in an image produced by imaging of one or more objects.

FIG. 11 is an example graph 1100 illustrating example resulting combined geometric difference values for a subject image, produced by imaging of one or more objects. In the example graph 1100, the combined geometric difference values are shown along a "Y" axis as "row differences," while an "X" axis depicts a location in a subject image as "column indices" (e.g., longitudinal slices of the subject image). In this example, combining the geometric difference values has yielded emphasized slopes where bag transitions may occur 1104, while mitigating those areas of the objects that are between transitions 1106 (e.g., the body of the objects).

Turning back to FIG. 7, at 714, integrated combined geometric difference values are generated, which comprises generating increased signal to noise ratios for combined geometric difference values for respective slices of the subject image. In this embodiment, increasing signal to noise ratios can comprise integrating the combined geometric differences to yield integrated combined geometric differences for the subject image, having a desired (e.g., higher) signal to noise ratio while reducing localized noise variations. Therefore, in one embodiment, resulting values may produce a one dimensional representation of the subject image having smoother variations with emphasized rising and falling edges for object transitions.

At 716, integrated combined geometric difference values are adjusted, which comprises resetting (e.g., setting to zero) consecutive integrated combined geometric difference values that are determined to be approximately constant. As an example, consecutive integrated combined geometric difference values that are within a variation threshold value may be determined to be approximately constant. Further, those areas having consecutive integrated combined geometric differences determined to be approximately constant can be reset (e.g., set to zero). In this way, for example, a one-dimensional representation of integrated combined geometric differences values may yield areas that are approximately constant as zero, while areas that are not approximately constant (e.g., object transitions) may be shown as a rising and/or falling line.

Figure 12:
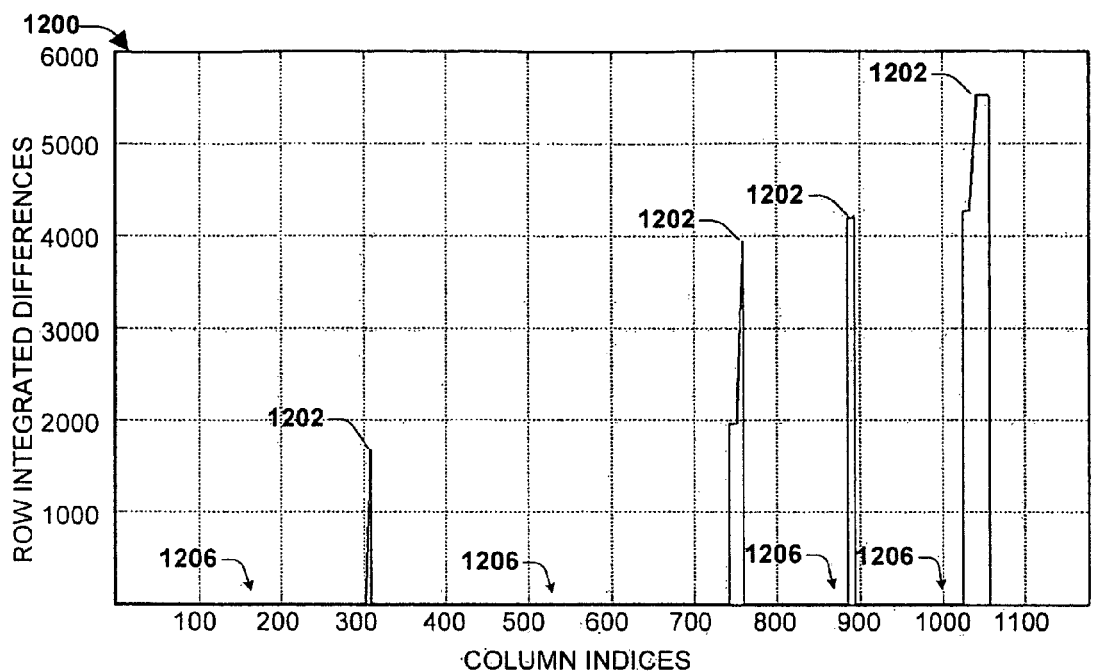
FIG. 12 is an example graph illustrating results from one or more portions of the method for segmenting objects in an image produced by imaging of one or more objects.

FIG. 12 is an example graph 1200 illustrating results from adjusting integrated combined geometric difference values in an image produced by imaging of one or more objects. In the example graph 1200, the adjusted integrated combined geometric difference values are shown along a "Y" axis as "row integrated differences," while an "X" axis depicts a location in a subject image as "column indices" (e.g., longitudinal slices of the subject image). In this example, the signal to noise ratios of the combined geometric differences has been increased to yield emphasized rising and falling lines for the object transition locations 1202. Additionally, areas that have been determined to be constant 1206 (e.g., object bodies), have been reset (e.g., set to zero), for example, to further emphasize object transitions.

Figure 13:
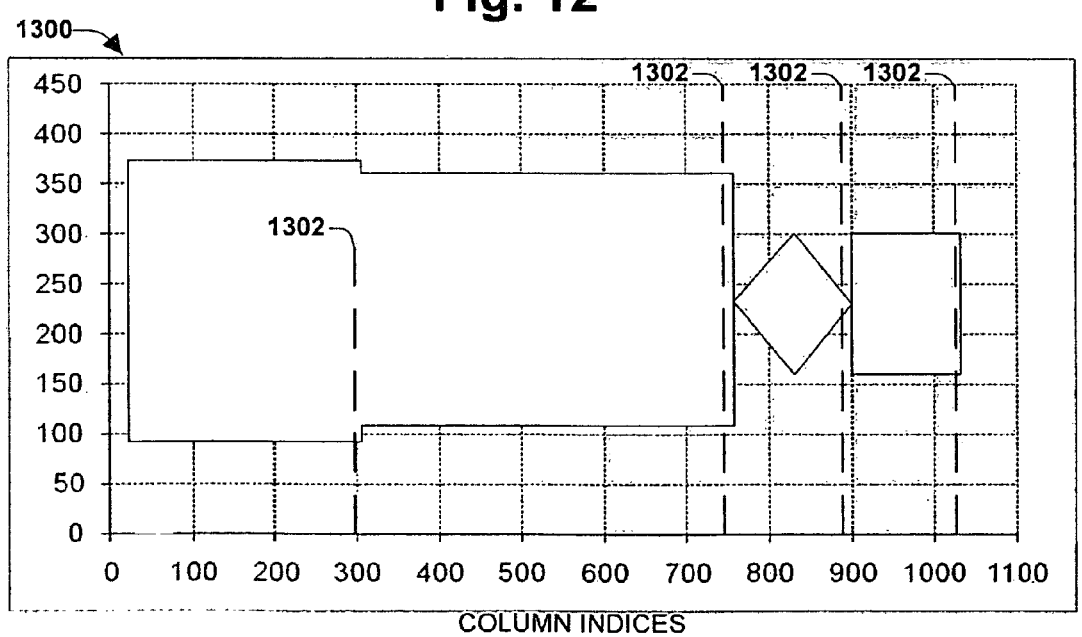
FIG. 13 is an example graph illustrating results from one or more portions of the method for segmenting objects in an image produced by imaging of one or more objects.

Turning again back to FIG. 7, at 718, one or more transitions between two or more objects in an image are identified using the adjusted integrated combined geometric difference values. As described above, in FIG. 6 at 612, in one embodiment, the geometric difference values can be run through an algorithm, for example, that detects object transitions in the geometric differences based on a threshold value for the adjusted integrated combined geometric difference values. FIG. 13 is an example graph 1300 illustrating results of example transition identification for a subject image. In this example, in one embodiment, those areas of the subject image having adjusted integrated combined geometric difference values that met a threshold for object segmentation have been identified 1302.

Having identified one or more transitions between two or more objects in an image, the example method 700, in FIG. 7, ends at 720.

Figure 14:
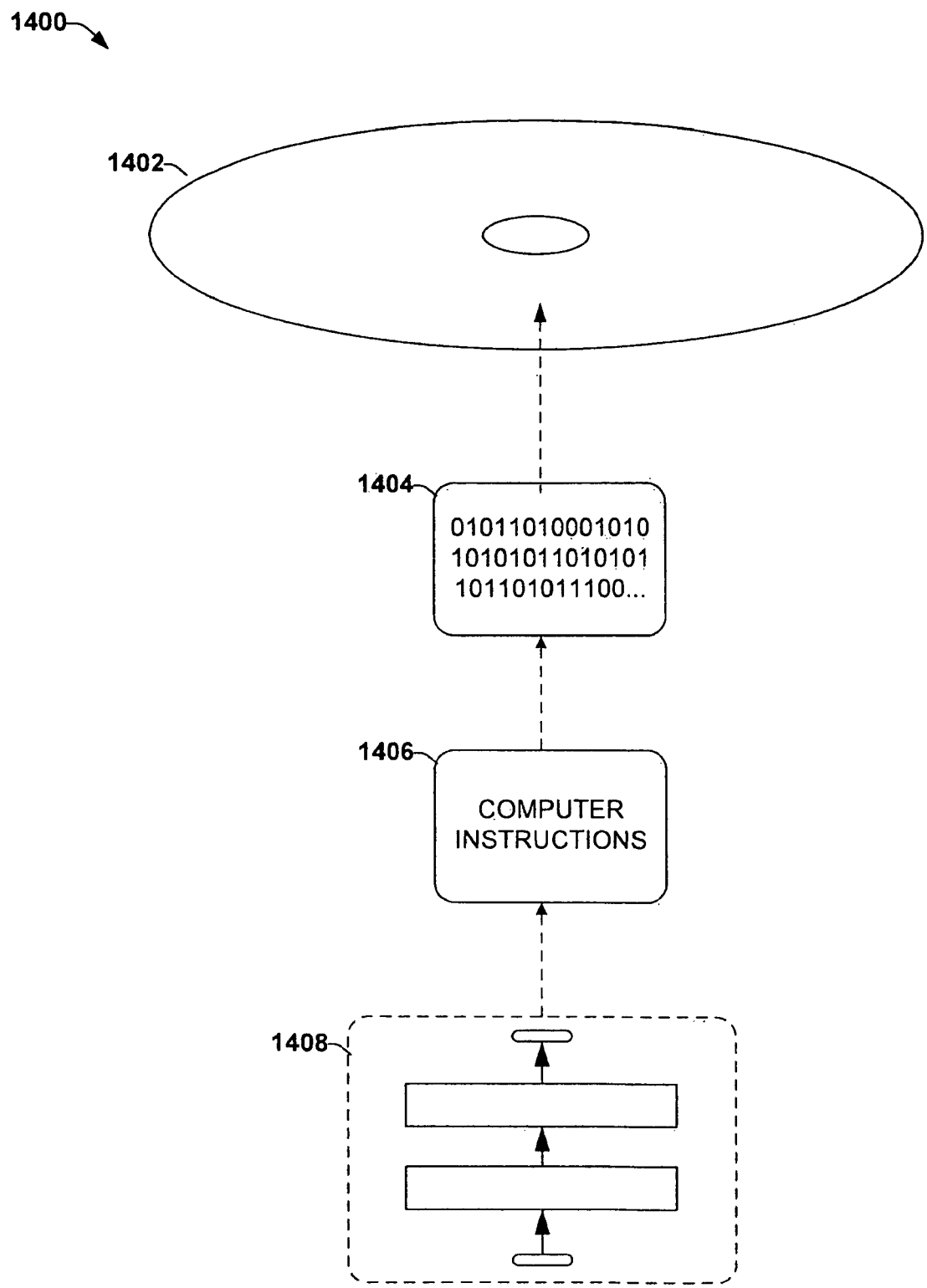
FIG. 14 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 14, wherein the implementation 1400 comprises a computer-readable medium 1402 (e.g., a CD-R, DVD-R, or a platter of a hard disk drive), on which is encoded computer-readable data 1404. This computer-readable data 1404 in turn comprises a set of computer instructions 1406 configured to operate according to one or more of the principles set forth herein. In one such embodiment 1400, the processor-executable instructions 1406 may be configured to perform a method, such as the exemplary method 600 of FIG. 6, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for segmenting one or more objects in a subject image resulting from subjecting one or more objects to imaging using an imaging apparatus, comprising:
generating image object borders comprising:
performing edge detection on the subject image; and
identifying object border locations, in the subject image, corresponding to merely outline edges of respective one or more objects;
generating a geometric difference of at least some of the image object borders for respective one or more slices of the subject image; and
identifying one or more transitions between two or more objects in the subject image using one or more the geometric difference values.

2. The method of claim 1, comprising filtering one or more geometric differences using a threshold value.

3. The method of claim 2, comprising:
adjusting the filtered geometric differences comprising resetting consecutive filtered geometric difference values determined to be approximately constant; and
generating combined geometric difference values comprising combining an adjusted filtered geometric difference value with a corresponding pre-filtered geometric difference value.

4. The method of claim 3, comprising:
generating integrated combined geometric difference values comprising generating increased signal to noise ratios for the combined geometric difference values; and
adjusting the integrated combined geometric difference values comprising resetting consecutive combined geometric difference values determined to be approximately constant.

5. The method of claim 4, comprising identifying one or more transitions between two or more objects in the subject image using the adjusted integrated combined geometric difference values.

6. The method of claim 4, adjusting the integrated combined geometric difference values comprising resetting one or more areas of a one-dimensional representation of a difference of one or more combined geometric differences values determined to be approximately constant.

7. The method of claim 3, adjusting the filtered geometric differences comprising resetting one or more areas of a one-dimensional representation of at least some of the one or more geometric difference values determined to be approximately constant.

8. The method of claim 7, comprising:
determining slope areas of the one-dimensional representation; and
adjusting the filtered geometric differences comprising not adjusting the slope areas.

9. The method of claim 3, comprising:
determining slope areas of the consecutive filtered geometric difference values; and
adjusting the filtered geometric differences comprising not adjusting the slope areas of the consecutive filtered geometric difference values.

10. The method of claim 3, combining an adjusted filtered geometric difference value with a corresponding pre-filtered geometric difference value comprising subtracting the adjusted filtered geometric difference value from the corresponding pre-filtered geometric difference value.

11. The method of claim 3, resetting comprising setting to zero.

12. The method of claim 2, filtering one or more geometric differences comprising smoothing a one-dimensional representation of at least some of the one or more geometric differences for the subject image.

13. The method of claim 2, the threshold value comprising an adaptive threshold value.

14. The method of claim 2, comprising:
generating an adaptive threshold value for respective geometric differences; and
filtering at least some of the one or more geometric differences using the adaptive threshold value.

15. The method of claim 1, generating image object borders comprising generating an object border image using merely outline edges of respective one or more objects.

16. The method of claim 1, generating a geometric difference comprising finding an absolute value of a difference between a top half of the image object borders and a bottom half of the image object borders for respective longitudinal slices of the subject image.

17. The method of claim 1, identifying one or more transitions comprising:
identifying where the adjusted combined geometric difference values change from reset to integration in a sequence of adjusted combined geometric difference values.

18. The method of claim 17, the sequence of adjusted combined geometric difference values corresponding to longitudinal slices of the subject image.

19. A non-transitory computer readable medium storing a computer program, the computer program configured to segment one or more objects in a subject image resulting from subjecting one or more objects to imaging using an imaging apparatus, the computer program, when executed on a computing device, configured to cause the computing device to:
generate image object borders comprising:
performing edge detection on the subject image; and
identifying object border locations, in the subject image, corresponding to merely outline edges of respective one or more objects;
generate a geometric difference of at least some of the image object borders for respective longitudinal slices of the subject image; and identify one or more transitions between two or more objects in the subject image using one or more geometric difference values.

20. A system for segmenting one or more objects in a subject image resulting from subjecting one or more objects to imaging using an imaging apparatus, the system configured to:
  generate image object borders comprising:
    performing edge detection on the subject image; and
    identifying object border locations, in the subject image, corresponding to merely outline edges of respective one or more objects;
  generate a geometric difference of at least some of the image object borders for respective slices of the subject image; and
  identify one or more transitions between two or more objects in the subject image using one or more geometric difference values.

21. The system of claim 20 configured to filter one or more geometric differences using a threshold value.

* * * * *

UNITED STATES PATENT AND TRADEMARK OFFICE
CERTIFICATE OF CORRECTION

PATENT NO. : 8,311,268 B2
APPLICATION NO. : 12/199333
DATED : November 13, 2012
INVENTOR(S) : Douglas Q. Abraham and Yesna Oyku Yildiz It is certified that error appears in the above-identified patent and that said Letters Patent is hereby corrected as shown below:

In the Claims:

Claim 1, Column 13, Line 39: Delete the word "the" after the words "using one or more" and before the word "geometric"

Signed and Sealed this
Second Day of July, 2013

Teresa Stanek Rea
*Acting Director of the United States Patent and Trademark Office*